United States Patent Office 3,661,906
Patented May 9, 1972

3,661,906
2,4-DIACYLAMINO-6-AMINO-QUINAZOLINES
Paul Schmidt, Therwil, and Christian Egli, Rheinfelden, Switzerland, assignors to Ciba Corporation, Summit, N.J.
No Drawing. Filed Oct. 22, 1969, Ser. No. 868,591
Claims priority, application Switzerland, Nov. 13, 1968, 16,921/68
Int. Cl. C07d 51/48
U.S. Cl. 260—256.4 Q         6 Claims

ABSTRACT OF THE DISCLOSURE

Compounds of the formula

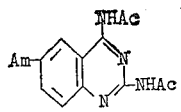

in which Ac stands for an acyl group, Am for an optionally substituted amino group, and which may be substituted in the benzene ring in positions 5,7 or 8 are useful as hypotensive and diuretic agents.

---

The present invention is concerned with new quinazolines. Especially it concerns quinazolines that contain an acylamino group in each of the positions 2 and 4 and an amino group in position 6, and their salts, as well as pharmaceutical compositions containing these compounds and a process for the treatment of water retention and hypertension, consisting in administering such compositions to a warm-blooded being.

Acyl residues that substitute the amino group in positions 2 and 4 are cycloaliphatic, aromatic, araliphatic or especially aliphatic acyl residues.

Aliphatic acyl residues of the formula R—CO— are especially those in which R is a lower alkyl group. Lower alkyl groups are, for example, those containing no more than 6 carbon atoms such as the methyl, ethyl, propyl, isopropyl residue, or linear or branched butyl, pentyl or hexyl residues linked in any desired position.

Cycloaliphatic acyl residues of the formula R'—CO— are especially those in which R' represents a lower cycloalkyl residue, which primarily contains 5 to 7 cyclic members, for example the cyclopentyl, cyclohexyl or cycloheptyl residue.

As aromatic and araliphatic acyl residues there may be mentioned, for example, benzoyl and naphthoyl residues and, respectively, phenyl-lower alkanoyl such as phenylacetyl, α- and β-phenylpropionyl residues.

The acyl residues mentioned may be further substituted.

As substituents for the aromatic and araliphatic acyl residues—which substituents are located on the rings—there may be mentioned, for example: Lower alkyl radicals such as those mentioned above; halogen atoms such as fluorine, chlorine, bromine or iodine or the pseudohalogen trifluoromethyl or lower alkoxy groups such as methoxy, ethoxy, propoxy, isopropoxy or methylenedioxy groups. One, two or more substituents are possible.

For the substitution of the aliphatic residue R there are specially suitable halogen atoms, such as those mentioned above, hydroxyl groups or amino groups.

The amino group in the 6-position is primarily unsubstituted, but it may also be mono- or di-substituted. Suitable substituted amino groups are, for example amino groups mono- or di-substituted by aliphatic, cycloaliphatic or araliphatic hydrocarbon residues which may be substituted and/or interrupted by hetero atoms such as nitrogen, oxygen or sulphur. Aliphatic hydrocarbon residues are especially lower aliphatic hydrocarbon residues, such as those mentioned above under the symbol R and also lower alkenyl or lower alkinyl residues, for example the vinyl, allyl or propenyl residue or a butenyl residue, such as the methallyl, 3-butenyl or crotyl residue, ethinyl, propargyl, 1-propinyl or 2- or 3-butinyl residues, or— in the case of a di-substitution—linear or branched lower alkylene residues or oxa-, aza- or thia-alkylene residues, for example butylene-(1,4), pentylene-(1,5), hexylene-(1,5), hexylene-(2,5), 3-oxapentylene-(1,5), 3-thiapentylene - (1,5), 2,4-dimethyl-3-thiapentylene-(1,5), 3-azapentylene - (1,5) or 3 - lower alkyl - 3 - aza-pentylene-(1,5) residues such as 3-methyl-3-azapentylene-(1,5) residues.

Cycloaliphatic hydrocarbon residues are saturated or unsaturated, especially also lower alkylated residues, preerably those containing 5 to 7 cyclic members such as those mentioned above and also cyclopentenyl or cyclohexenyl residues. As substituents of the aliphatic residues there are especially suitable the substituents mentioned above for R as well as lower alkoxy groups, especially those derived from the lower alkyl residues mentioned, and substituted amino groups. Substituted amino groups may have one or two substituents. Suitable substituents are for example aliphatic, cycloaliphatic and araliphatic hydrocarbon residues, such as those mentioned above or below and which may be substituted and/or interrupted by heteroatoms, such as nitrogen, oxygen or sulfur.

Araliphatic hydrocarbon residues, are, for example phenyl-lower alkyl residues, especially residues containing 7 to 10 carbon atoms, for example benzyl residues. These phenyl-lower alkyl residues may be substituted, for example, as indicated above for the araliphatic acyl residues as well as alkenyloxy residues, for example lower alkenyloxy residues, for example allyloxy residues; free or substituted amino groups, for example mono- or di-lower alkylamino groups, in which the lower alkyls are preferably those mentioned above; nitro groups or free or acylated hydroxyl groups, in which the acyl radical is preferably one of those mentioned, especially a lower alkanoyl or benzoyl residue.

A substituted amino group is preferably a mono-lower alkylamino group or a di-lower alkylamino group, a pyrrolidino or piperidino group which may be C-lower alkylated in the ring and/or β-mono-unsaturated in the ring, or a piperazino, N'-lower alkylpiperazino or N'-(hydroxylower alkyl)-piperazino, thiomorpholino or morpholino group which may be C-lower alkylated in the ring. Also suitable as substituted amino groups are possibly substituted methyleneamino groups. As substituents of the methyleneamino group there may be mentioned cycloaliphatic or possibly substituted aliphatic hydrocarbon residues, for example those mentioned above, or aromatic or araliphatic residues, for example phenyl- or phenyl-lower alkyl-residues such as benzyl or phenylethyl residues. As substituents for the alihatic hydrocarbon residues there are suitable, for example, the substituents mentioned above for R. An aromatic or araliphatic residue may be unsubstituted or substituted, primarily by the substituents mentioned above for the aromatic acyl residues.

The carbocycle of the new quinazolines may carry further substituents, for instance the residues mentioned above as substituents of the aromatic or araliphatic acyl residues.

The new compounds possess valuable pharmacological properties. Inter alia, they act as hypotensives as can be shown in animal tests, for example on oral administration of a dose of 100 to 300 mg./kg., on the DCA-salt hypertonic rat and on the renal-hypertonic rat. Furthermore, they possess, as can be shown in animal tests, for example on oral administration of 10 to 100 mg./kg., on the rat and on the dog a diuretic action with pronounced potassium retention, as well as a low toxicity.

The new compounds therefore are useful as potassium-retentive diuretics and as antihypertensives. The new compounds are also valuable intermediates for the manufacture of other useful substances, especially of pharmaceutically acting compounds.

Special mention deserve the compounds of the formula

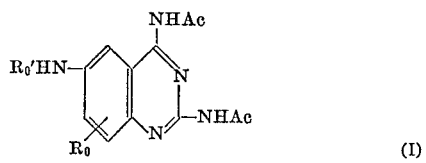

in which Ac is a lower alkanoyl residue; $R_0'$ represents hydrogen or a lower alkyl residue which is preferably unsubstituted but may also be substituted by halogen, hydroxyl or amino groups, by mono-lower alkylamino or especially di-lower alkylamino groups, by pyrrolidino or piperidino groups which may be C-lower alkylated in the ring and/or β-mono-unsaturated in the ring, or by piperazino, N'-lower alkylpiperazino or N'-(hydroxy-lower alkyl)-piperazino, thiomorpholino or morpholino groups which may be C-lower alkylated in the ring, or a phenyl-lower alkyl group whose aromatic residue may be substituted by halogen, hydroxyl, lower alkoxy, lower alkyl or amino groups, and $R_0$ represents halogen, especially chlorine, or a lower alkyl, trifluoromethyl, or lower alkoxy group, or in the first place hydrogen.

In this connection special mention deserve compounds of the Formula I, in which Ac represents a lower alkanoyl residue, $R_0'$ represents a lower alkyl residue substituted by chlorine, hydroxyl or one of the aforementioned amino groups, or preferably an unsubstituted lower alkyl residue, and $R_0$ represents chlorine, trifluoromethyl, a lower alkoxy or lower alkyl group or in the first place hydrogen.

A possibly present substituent $R_0$ is preferably in the 8-position.

A particularly valuable compound of this kind is, for example, 2,4-di-(acetamino)-6-amino-8-chloroquinazoline of the formula

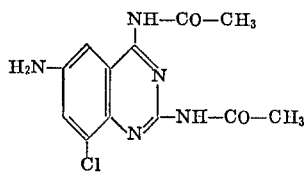

Compounds of the Formula I, in which Ac represents a lower alkanoyl residue and $R_0'$ and $R_0$ represent hydrogen, should be specially emphasized, especially compounds of the formula

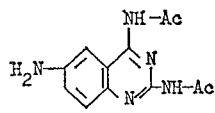

where Ac has the above meaning, more especially 2,4-di-(acetamino)-6-aminoquinazoline of the formula

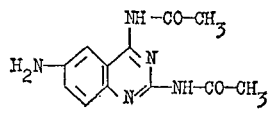

which, for instance when given in an oral dose of 10 mg./kg. to the rat, produces a distinct diuretic action with pronounced potassium retention.

The new compounds are manufactured by known methods.

Thus, in a quinazoline which contains an acylamino group in each of the positions 2 and 4 and carries in the 6-position a nitro group, the nitro group is reduced to an amino group and, if desired, a resulting compound is substituted by reaction with a corresponding aldehyde or ketone and, if desired, in a resulting Schiff's base the CN-double bond is reduced.

The reduction of the nitro group is carried out in the usual manner, for example with catalytically activated hydrogen, preferably in the presence of a nickel catalyst, palladium, possibly on animal carbon, platinum or oxides thereof, such as Raney nickel.

A resulting compound that contains in positions 6 a free amino group may be converted into a Schiff's base with an appropriate aldehyde or ketone or a reactive functional derivative thereof, for example a hydrate, acetal or ketal or bisulphite adduct. The reaction is carried out in the usual manner, for example at an elevated temperature and in a suitable organic solvent, for example ethanol.

In a resulting Schiff's base the azomethine bond can be reduced to arrive at the corresponding amines. The reduction is preferably carried out with the conventional reducing agents such as catalytically activated hydrogen, for example in the presence of a nickel catalyst or platinum- or palladium-oxide, such as Raney nickel, advantageously in a suitable solvent, for example in ethanol.

As starting materials for the reduction there may be used in the place of the Schiff's base a mixture of suitable aldehydes or ketones or of reactive functional derivatives thereof, for example those mentioned above, and a quinazoline that contains in position 6 a free or monosubstituted amino group. In this manner it is possible to introduce also two substituents into an unsubstituted amino group in a single step.

These reactions are performed in the usual manner in the presence or absence of diluents, condensing agents and/or catalysts, with or without cooling or heating, if necessary in a closed vessel.

Depending on the reaction conditions and starting materials the final products are obtained in free form or in form of their acid addition salts which are likewise included in the invention. Thus, for example, basic, neutral or mixed salts, possibly also their hemi-, mono-, sesqui- or polyhydrates may result. The acid addition salts of the new compounds can be converted into the free compound in known manner, for example with basic means such as alkalies or ion exchange resins. On the other hand, resulting free bases can form salts with inorganic or organic acids. Acid addition salts are preferably manufactured with acids that are suitable for the formation of therapeutically acceptable salts. Such acids are, for example, hydrohalic acids, sulphuric acids, phosphoric acids, nitric and perchloric acid; aliphatic, alicyclic, aromatic or heterocyclic carboxylic acids or sulphonic acids, such as formic, acetic, propionic, succinic, glycollic, lactic, malic, tartaric, citric, ascorbic, maleic, hydroxymaleic or pyruvic acid; phenylacetic, benzoic, p-aminobenzoic, anthranilic, p-hydroxybenzoic, salicyclic or p-aminosalicyclic acid, embonic, methanesulphonic, ethane- or hydroxyethane-sulphonic and ethylenesulphonic acid; halobenzenesulphonic, toluenesulphonic, naphthalenesulphonic or sulphanilic acid; methionine, tryptophan, lysine or arginine.

These or other salts of the new compounds, for example their picrates, may be used for purifying the resulting free bases by converting the free bases into salts, separating the salts and liberating the bases again from the salts. In view of the close relationship between the new pounds in free form and in form of their salts, what has been said above and hereinafter with regard to the free compounds concerns also the corresponding salts wherever this is possible and useful.

The invention includes also any variant of the present process in which an intermediate obtainable at any stage of the process is used as starting material and any remaining step(s) is/are carried out, or in which a starting material is formed under the reaction conditions or in which a reactant may be used in form of a salt thereof.

The reactions of this invention are advantageously performed with starting materials that give rise to the groups of final products specially mentioned above and more especially to the specifically described or emphasized final products.

The starting materials are known or, insofar as they are new, they can be manufactured by known methods.

The new compounds can be used as medicaments, for example in form of pharmaceutical preparations that contain them or their salts in conjunction or admixture with an organic or inorganic, solid or liquid pharmaceutical excipient suitable for enteral, parenteral or local administration. Suitable excipients are substances that do not react with the new compounds, for example water, gelatin, lactose, starches, magnesium stearate, talcum, vegetable oils, benzyl alcohols, gums, polyalkyleneglycols, white petroleum jelly, chloesterol or other known medicinal excipients. The pharmaceutical preparations may be, for example, tablets, dragees, ointments or creams, or in liquid form solutions, (for example, as an elixir or syrup), suspensions or emulsions. They may be sterilized and/or contain assistants such as preserving, stabilizing, wetting or emulsifying agents, salts for regulating the osmotic pressure or buffers. They may also contain further therapeutically valuable substances. The preparations are formulated by known methods.

The following non-limiting example illustrates the invention.

EXAMPLE 1

2.9 grams of 2,4-di-(acetylamino)-6-nitroquinazoline are hydrogenated in 150 ml. of dimethylformamide with addition of 5 g. of Raney nickel. The catalyst is filtered off, the filtrate evaporated to dryness under vacuum and the residue is triturated with ethanol, to give 2,4-di-(acetylamino)-6-amino-quinazoline of the formula

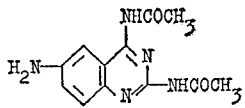

in form of yellow crystals which melt at 246–247° C. after recrystallization from ethanol.

When 1.3 equivalents of hydrogen chloride dissolved in ethanol are added to a suspension of the base in hot ethanol, the hydrochloride, melting at 245° C. with decomposition, is obtained.

The 2,4-(diacetylamino)-6-nitroquinazoline used as starting material can be prepared, for example, thus:

An intimate mixture of 8.2 g. of 2-amino-5-nitrobenzonitrile and 18 g. of guanidine carbonate is heated for 7 hours in an oilbath at 185° C. The reaction product is triturated with water and then dissolved with heating in 0.5 N-hydrochloric acid. The insoluble material is filtered off and the filtrate adjusted to a pH value of 8 to 9 by means of 2 N-sodium carbonate solution, whereupon 2,4-diamino-6-nitroquinazoline settles out in form of a reddish precipitate melting above 330° C.

When this product is dissolved in a minimum of 0.5 N-hydrochloric acid with heating and an excess of concentrated hydrochloric acid is added and the whole allowed to cool, the hydrochloride melting at about 340° C. with decomposition is obtained.

5 grams of 2,4-diamino-6-nitroquinazoline in 250 ml. of acetic anhydride are stirred and heated at the boil for 4 hours. After cooling, the precipitate formed is suctioned off and thoroughly stirred with water, to yield 2,4-(diacetylamino)-6-nitroquinazoline which melts at 275° C. with decomposition after recrystallization of dimethylformamide.

EXAMPLE 2

Capsules, each containing 100 mg. of active substance, are prepared as follows:

Composition of capsule

|  | Mg. |
|---|---|
| 2,4-di-(acetylamino)-6-aminoquinazoline | 100 |
| Lactose | 150 |
| Polyvinylpyrrolidone | 15 |
| Talcum | 15 |
|  | 280 |

Method 2,4-di-(acetylamino) - 6 - amino-quinazoline is mixed with the lactose. The mixture is moistened with a solution of polyvinyl pyrrolidone in methylene chloride and kneaded while more methylene chloride is added until a plastic mass is obtained.

The moist mass is forced through an about 3 mm. mesh sieve, dried, and the dry granulate again passed through a sieve. The talc is admixed and the granulate then filled into push-fit capsules.

EXAMPLE 3

According to the methods described herein, e.g. in an analogous manner to that described in Example 1, and, if necessary, subsequent transformation into a Schiff's base and, if necessary, reduction of the Schiff's base the following compounds can be prepared:

(a) 2,4-di-(hexahydrobenzoylamino)-6-(cyclohexylideneamino)-8-methyl-quinazoline,
(b) 2,4-di-(alanylamino)-6-benzylamino-quinazoline,
(c) 2,4-di-(phenylacetamino)-6-methylamino-8-chloro-quinazoline,
(d) 2,4-di-(para-toluoylamino)-6-(ortho-allyloxy-benzylamino)-quinazoline,
(e) 2,4-di-(ortho-methoxy-phenylacetamino)-6-piperidino-8-ethoxy-quinazoline,
(f) 2,4-di-(para-chloro-phenylacetamino)-6-(diethylamino)-quinazoline,
(g) 2,4-di-(isobutyrylamino)-6-(beta-dimethylamino-ethylamino)-quinazoline,
(h) 2,4-di-(γ-hydroxy-butyrylamino)-6-(methallylamino)-quinazoline,
(i) 2,4-di-(valylamino)-6-(2,6-dimethyl-thiomorpholino)-quinazoline,
(j) 2,4-di-(chloroacetamino)-6-piperazino-8-trifluormethyl-quinazoline,
(k) 2,4-di-(propionylamino)-6-(cyclopentylamino)-7-methyl-quinazoline,
(l) 2,4-di-(valerylamino)-6-(ethylideneamino)-5-methyl-quinazoline,
(m) 2,4-di-(benzoylamino)-6-[β-(para-chloro-phenyl)-ethylideneamino]-quinazoline,
(n) 2,4-di-(acetamino)-6-(β-methoxy-ethylamino)-quinazoline,
(o) 2,4-di-(cyclopentylcarbonylamino)-6-[di-(β-chlorethyl)-amino]-quinazoline,
(p) 2,4-di-(meta-methoxy-benzoylamino)-6-[β-(para-hydroxy-phenyl-ethyl)-amino]-quinazoline,
(g) 2,4-di-(bromoacetamino)-6-(benzylideneamino)-quinazoline.

We claim:
1. A member selected from the group consisting of compounds of the formula

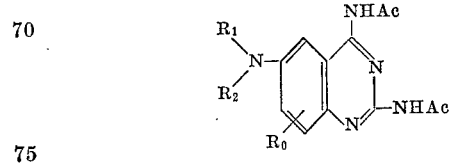

in which Ac stands for lower alkanoyl, $R_1$ and $R_2$ each stands for a member selected from the group consisting of hydrogen, lower alkyl and lower cycloalkyl, and $R_0$ stands for a member selected from the group consisting of hydrogen, lower alkyl, chlorine and lower alkoxy, and its therapeutically acceptable acid addition salts.

2. A product as claimed in claim 1, in which Ac represents lower alkanoyl, $R_2$ stands for a member selected from the group consisting of hydrogen and lower alkyl, $R_1$ stands for hydrogen, and $R_0$ stands for a member selected from the group consisting of chlorine, lower alkyl, lower alkoxy and hydrogen.

3. A product as claimed in claim 2 in which the 8-position is occupied by a member selected from the group consisting of lower alkyl, chlorine and lower alkoxy.

4. A product as claimed in claim 1, which is 2,4-di-(acetamino)-6-amino-8-chloro-quinazoline.

5. A product as claimed in claim 1 in which Ac stands for lower alkanoyl and $R_0$, $R_1$ and $R_2$ stand for hydrogen.

6. A product as claimed in claim 1 which is 2,4-di-(acetamino)-6-amino-quinazoline.

References Cited

C.A. 30, 1796[7], Abstract of Vopicka et al., J. Am. Chem. Soc., 57, 1068–70 (1935).

ALEX MAZEL, Primary Examiner

R. V. RUSH, Assistant Examiner

U.S. Cl. X.R.

260—243 B, 247.2 A; 424—232, 246, 250, 251